(12) United States Patent
Qvist et al.

(10) Patent No.: US 11,009,842 B2
(45) Date of Patent: May 18, 2021

(54) DATA COLLECTION SYSTEM FOR WIND TURBINE DATA

(71) Applicant: VESTAS WIND SYSTEMS A/S, Aarhus N (DK)

(72) Inventors: Martin Qvist, Højbjerg (DK); Jesper Schmidt, Egå (DK); Niels Erik Danielsen, Brabrand (DK); Morten Tim Thorsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 114 days.

(21) Appl. No.: 16/091,457

(22) PCT Filed: Mar. 15, 2017

(86) PCT No.: PCT/DK2017/050075
§ 371 (c)(1),
(2) Date: Oct. 4, 2018

(87) PCT Pub. No.: WO2017/174084
PCT Pub. Date: Oct. 12, 2017

(65) Prior Publication Data
US 2019/0155235 A1 May 23, 2019

(30) Foreign Application Priority Data
Apr. 7, 2016 (DK) .......................... PA 2016 70205

(51) Int. Cl.
*G05B 19/042* (2006.01)
*F03D 7/04* (2006.01)
(Continued)

(52) U.S. Cl.
CPC .......... *G05B 19/042* (2013.01); *F03D 7/047* (2013.01); *F03D 7/048* (2013.01); *F03D 17/00* (2016.05);
(Continued)

(58) Field of Classification Search
CPC .......... F03D 17/00; F03D 7/047; F03D 7/048; F05B 2220/30; F05B 2260/80;
(Continued)

(56) References Cited

U.S. PATENT DOCUMENTS 9,857,825 B1 * 1/2018 Johnson .................... G05F 5/00
2002/0029097 A1 3/2002 Pionzio et al.
(Continued)

FOREIGN PATENT DOCUMENTS

EP 1438501 A1 7/2004
EP 1791047 A2 5/2007
(Continued)

OTHER PUBLICATIONS

PCT Notification of Transmittal of the International Search Report and the Written Opinion of the International Searching Authority, or the Declaration for Application No. PCT/DK2017/050075 dated Jun. 25, 2017.
(Continued)

*Primary Examiner* — Chad G Erdman
(74) *Attorney, Agent, or Firm* — Patterson + Sheridan, LLP

(57) ABSTRACT

A method, controller, wind turbine, and computer program product are disclosed for collecting data from wind turbines in a wind farm. An example method generally includes receiving, from a client device, a subscription request identifying a plurality of data points to collect from a set of wind turbines. A wind farm server establishes a client interface with the client device. The wind farm server receives data points form the plurality of wind turbines and buffers the identified collected data points from the set of wind turbines in a data repository. Through the client interface, the wind farm server receives a request for data points collected from at least one wind turbine over a specified time period, and
(Continued)

responsive to the request, transmits the requested data points to the client device. The wind farm server also may push collected data points from wind turbines to a data analysis system.

20 Claims, 7 Drawing Sheets

(51) Int. Cl.
*F03D 17/00* (2016.01)
*H04L 12/24* (2006.01)
*H04L 29/08* (2006.01)
*H04L 29/06* (2006.01)

(52) U.S. Cl.
CPC .......... *H04L 41/0896* (2013.01); *H04L 67/12* (2013.01); *F05B 2220/30* (2013.01); *F05B 2260/80* (2013.01); *F05B 2270/20* (2013.01); *F05B 2270/402* (2013.01); *G05B 2219/2619* (2013.01); *H04L 67/42* (2013.01); *Y02E 10/72* (2013.01)

(58) Field of Classification Search
CPC .......... F05B 2270/20; F05B 2270/402; G05B 19/042; G05B 2219/2619; H04L 41/0896; H04L 67/12; H04L 67/42; Y02E 10/723
See application file for complete search history.

(56) References Cited

U.S. PATENT DOCUMENTS

| 2005/0090937 | A1 | 4/2005 | Moore et al. |
| 2010/0114994 | A1 | 5/2010 | Huang et al. |
| 2014/0156806 | A1* | 6/2014 | Karpistsenko .......... G06Q 50/28 709/219 |
| 2014/0172866 | A1* | 6/2014 | Lin ...................... G06F 16/2272 707/741 |
| 2016/0014210 | A1* | 1/2016 | Thomas ................ H04L 67/141 709/227 |

FOREIGN PATENT DOCUMENTS

| EP | 2725745 A1 * | 4/2014 | ........ H02J 13/00034 |
| EP | 2725745 A1 | 4/2014 | |
| WO | 2008086801 A2 | 7/2008 | |
| WO | WO2014153673 A1 * | 3/2013 | ............ F03D 7/048 |
| WO | 2014029440 A1 | 2/2014 | |
| WO | 2014153673 A1 | 10/2014 | |
| WO | 2017174084 A1 | 10/2017 | |

OTHER PUBLICATIONS

Danish Patent and Trademark Office First Technical Examination for Application No. PA 2016 70205 dated Nov. 24, 2016.
Olsen, Andreas Kargard et al. Prototype of generic server for wind power plants using iec 61400-25 standard; International journal of distributed energy resources; 2007: Chapter 2.1 section 7; chapter 2.2 sections 5, 6, 7, 8; chapter 3.3 section 3; chapter 3.4 sections 7, 8; chapter 5.1section4; chapter 5.2 section 3; chapter 5.3 sections 1, 3, 13; chapter 6 sections I, 13 ,14.

* cited by examiner

DATA COLLECTION SYSTEM FOR WIND TURBINE DATA

BACKGROUND

Field of the Invention

Embodiments presented in this disclosure generally relate to techniques for collecting and buffering data from wind turbines as well as making buffered data available to client systems for analysis.

Description of the Related Art

Wind turbines generally include a variety of sensors that are used to monitor operating parameters of a wind turbine. These sensors generally gather data about turbine components (e.g., turbine rotational speed, system temperature, blade pitch and yaw, power output), the turbine electrical system, weather data (e.g., wind speed and direction), and so on. To allow a technician to monitor and control a wind turbine, the wind turbine generally provides data to a supervisory data acquisition and control (SCADA) system via a network connection. The SCADA system generally provides systems for monitoring and processing data received from a wind turbine. The SCADA system can display operations data for the wind turbines in a wind farm, for example, by requesting data from one or more wind turbines according to a pre-configured interval for each of the sensors and/or turbine data points that are to be monitored. Additionally, SCADA systems allow a technician to control a wind turbine by providing control signals to modify operating parameters (e.g., maximum rotational speed, temperature settings, and so on).

Wind farms may be connected to remote SCADA and other management systems via network connections from a wind farm to the remote systems. In some cases, a wired connection may connect the wind farm to the remote systems. Such a connection generally provides for cost-effective and high-bandwidth data transfer between the wind farm and remote systems. For wind farms located in areas that make wired data connections impractical, wind turbines may transfer data to remote systems using a wireless communications system, such as satellite communications systems. Communications over wireless systems are generally expensive on a per-megabyte basis and may not always be able to successfully transfer data to or from a wind turbine.

SUMMARY

One embodiment of the present disclosure is a method for collecting data from a plurality of wind turbines. The method generally includes receiving, from a client device, a subscription request identifying a plurality of data points to collect from a set of wind turbines. A wind farm server establishes a client interface with the client device. The wind farm server receives data points from the plurality of wind turbines and buffers the identified collected data points from the set of wind turbines in a data repository. In some cases, the plurality of wind turbines may be identified in a subscription list maintained by the wind farm server identifying the turbines and data points to buffer. Through the client interface, the wind farm server receives a request for at least one of the data points collected from at least one of the set of wind turbines over a specified time period. Responsive to the request, the wind farm server transmits the requested data points from the data repository to the client device. In some cases, the server may perform additional processing (e.g., data resampling or aggregation) on the requested data points before transmitting the requested data points to the client device.

The method advantageously allows for a decoupling of data consumers from the wind turbines in a wind farm. Unprocessed, bulk sensor data may be transmitted to a server and provided from the server to one or more client systems on request. By obtaining unprocessed sensor data from the wind turbines, processing or other computationally expensive operations may be offloaded from wind turbines with limited processing capabilities to computer systems with more extensive processing capabilities. Additionally, the method advantageously provides for simplified maintenance of data services within a wind farm. Turbines may be connected or disconnected from a wind farm server without overloading or otherwise affecting a wind turbine controller, and data services may be maintained and expanded using standard computer hardware.

Another embodiment of the present disclosure is a computer program product comprising a computer-readable device having computer-readable program code embodied therewith, the computer-readable program code configured to perform an operation for collecting data from a plurality of wind turbines. The operation generally includes receiving, from a client device, a subscription request identifying a plurality of data points to collect from a set of wind turbines. In some cases, the plurality of wind turbines may be identified in a subscription list maintained by the wind farm server identifying the turbines and data points to buffer. A wind farm server establishes a client interface with the client device. The wind farm server receives data points from the plurality of wind turbines and buffers the identified collected data points from the set of wind turbines in a data repository. Through the client interface, the wind farm server receives a request for at least one of the data points collected from at least one of the set of wind turbines over a specified time period. Responsive to the request, the wind farm server transmits the requested data points from the data repository to the client device. In some cases, the server may perform additional processing (e.g., data resampling or aggregation) on the requested data points before transmitting the requested data points to the client device.

The computer program product advantageously allows for a decoupling of data consumers from the wind turbines in a wind farm. Unprocessed, bulk sensor data may be transmitted to a server and provided from the server to one or more client systems on request. By obtaining unprocessed sensor data from the wind turbines, processing or other computationally expensive operations may be offloaded from wind turbines with limited processing capabilities to computer systems with more extensive processing capabilities. Additionally, the method advantageously provides for simplified maintenance of data services within a wind farm. Turbines may be connected or disconnected from a wind farm server without overloading or otherwise affecting a wind turbine controller, and data services may be maintained and expanded using standard computer hardware.

Another embodiment of the present disclosure is a system comprising a processor and memory having instructions thereon configured to perform an operation for collecting data from a plurality of wind turbines. The operation generally includes receiving, from a client device, a subscription request identifying a plurality of data points to collect from a set of wind turbines. In some cases, the plurality of wind turbines may be identified in a subscription list maintained by the wind farm server identifying the turbines and data points to buffer. A wind farm server establishes a client interface with the client device. The wind farm server receives data points from the plurality of wind turbines and buffers the identified collected data points from the set of wind turbines in a data repository. Through the client interface, the wind farm server receives a request for at least one of the data points collected from at least one of the set of wind turbines over a specified time period. Responsive to the request, the wind farm server transmits the requested data points from the data repository to the client device. In some cases, the server may perform additional processing (e.g., data resampling or aggregation) on the requested data points before transmitting the requested data points to the client device.

The system advantageously allows for a decoupling of data consumers from the wind turbines in a wind farm. Unprocessed, bulk sensor data may be transmitted to a server and provided from the server to one or more client systems on request. By obtaining unprocessed sensor data from the wind turbines, processing or other computationally expensive operations may be offloaded from wind turbines with limited processing capabilities to computer systems with more extensive processing capabilities. Additionally, the method advantageously provides for simplified maintenance of data services within a wind farm. Turbines may be connected or disconnected from a wind farm server without overloading or otherwise affecting a wind turbine controller, and data services may be maintained and expanded using standard computer hardware.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments presented herein provide techniques for collecting data from wind turbines in a wind farm. As discussed, wind turbines may be connected to a server via a raw data stream. Sensor data transmitted on the raw data stream from a wind turbine to a wind farm server is generally stored at the wind farm server and provided to client systems in response to requests for the data or according to a configured data retrieval policy. The wind farm server may, in some cases, process data provided to client systems in response to requests or in response to a configured data retrieval policy. In some cases, the wind farm server provides the sensor data through a web service that exposes a data query interface to a client system.

By collecting data from wind turbines at a wind farm server and providing the data from the wind farm server to one or more client systems on request, a data collection system can obtain wind turbine data in bulk. Doing so decouples data consumers (e.g., client devices, such as SCADA systems used to monitor operations at a wind farm) from the wind turbines in the wind farm. Additionally, decoupling data consumers from the wind turbines in the wind farm relieves a data collection system from needing to perform processing or other computationally expensive operations at the wind turbines, which frequently have limited processing capabilities relative to the wind farm server.

Figure 1:
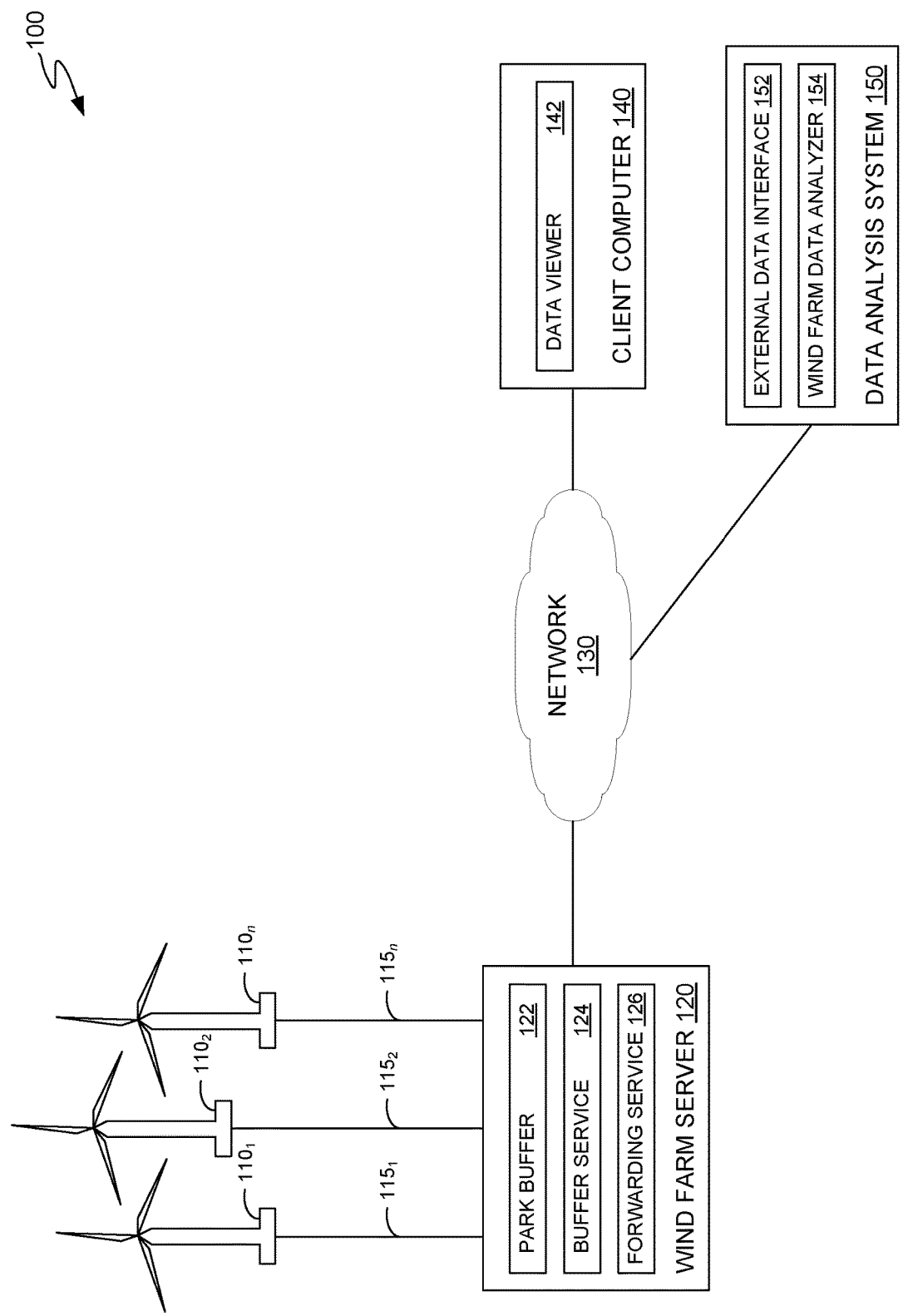
FIG. 1 illustrates an example wind turbine data collection system, according to an embodiment of the present disclosure.

FIG. 1 illustrates an example data collection system 100, according to one embodiment. As illustrated, a wind farm may include a plurality of wind turbines 110 and a wind farm server 120. Each of the wind turbines 110 are generally connected to the wind farm server 120 via a raw data stream 115. The raw data stream 115 may be, for example, an Ethernet connection, coaxial connection, fibre optic connection, or other suitable data connection between a wind turbine 110 and wind farm server 120. Wind farm server 120, client computer 140, and data analysis system 150 may be connected via network 130 to allow client computer 140 and data analysis system 150 to obtain data from wind farm server 120, as discussed in further detail below.

Each of the wind turbines 110 generally include a plurality of sensors that monitor various operating conditions within a wind turbine 110. For example, the sensors may include temperature sensors at various locations within a wind turbine 110, speed sensors used to monitor the rotational speed of various components within a wind turbine 110 (e.g., main shaft, gearbox components, and so on), vibration sensors, power production sensors, and so on. The sensors may generate real-time data for output to a wind farm server via raw data stream 115. In some cases, the sensors can generate raw data as voltage outputs that can be correlated to an actual data point (e.g., rotational speed in revolutions per minute, generated power in watts (or megawatts), component temperatures in degrees Celsius, and so on).

Data may be pulled from each of the plurality of sensors periodically according to a timer configured for each of the plurality of sensors. For example, an internal rotational speed sensor for a gearbox in wind turbine 110 may be pulled continuously or substantially continuously, while data from other sensors may be pulled with a lower periodicity. In some cases, sensor data may be stored in a temporary buffer at wind turbine 110 until the sensor data is successfully transmitted to wind farm server 120 via raw data stream 115. The temporary buffer may accommodate sensor data for a number of days of wind turbine operation, and a computing system at wind turbine 110 may remove data from the temporary buffer when data is successfully transmitted to wind farm server 120.

Some data may be generated in response to events that occur in an irregular pattern. For example, a wind turbine 110 may generate some data based on alarms or events that occur while during wind turbine operations. An alarm may include, for example, gearbox overspeed or overheating events. Responsive to an alarm, wind turbine 110 can transmit an indication of the alarm, a timestamp, and the conditions that generated the alarm to wind farm server 120 via raw data stream 115. The temporary buffer at a wind turbine 110 may be used to temporarily store alarms or other event data for a number of days of wind turbine operation or store a number of alarm or event entries. A computing system at wind turbine 110 may remove alarm or event data from the temporary buffer when data is successfully transmitted to wind farm server 120.

In some cases, wind turbine 110 may determine whether to store sensor data in a temporary buffer at wind turbine 110 or at wind farm server 120 based on whether wind turbine 110 detects that wind farm server 120 is online. Wind turbine 110 may detect that wind farm server 120 is online, for example, by detecting a heartbeat broadcast by wind farm server 120 on a data uplink. The data uplink may be carried on raw data stream 115 or may on a dedicated connection between wind turbine 110 and wind farm server 120. If wind turbine 110 detects a heartbeat or other information indicating that wind farm server 120 is online, wind turbine 110 can transmit sensor data to wind farm server 120 as a computing system at wind turbine 110 gathers data from the plurality of sensors.

If wind turbine 110 does not detect a heartbeat or other information indicating that wind farm server 120 is online, a computing system at wind turbine 110 can store sensor data in the temporary buffer. Wind turbine 110 generally continues to monitors for a heartbeat or other information indicating that wind farm server 120 is online. When wind turbine 110 detects a heartbeat or other information indicating that wind farm server is online and ready to receive data from the wind turbines 110, wind turbine 110 can transmit the data stored in the temporary buffer to wind farm server 120. In some cases, wind turbine 110 can transmit the data stored in the temporary buffer using a lossless protocol (e.g., a protocol requiring that the wind farm server 120 acknowledge successful receipt of the buffered data). If wind turbine 110 receives a negative acknowledgment or does not receive any response from wind farm server 120 within a timeout period, wind turbine 110 can retransmit the buffered sensor data. Otherwise, upon receiving an acknowledgment of successful receipt from wind farm server 120 (or other data indicating that wind farm server 120 successfully received the buffered data), a computing system at wind turbine 110 can delete the acknowledged sensor data.

Wind farm server 120 is generally configured to store sensor data from a plurality of wind turbines 110 in a wind farm and make the stored sensor data available to one or more client systems for display and analysis. As illustrated, wind farm server 120 generally includes a park buffer 122, a buffer service 124, and a forwarding service 126. A wind farm may include multiple wind farm servers 120. In a deployment including multiple wind farm servers 120, buffer service 124 at one of the wind farm servers may retrieve data from the park buffers 122 at each of the wind farm servers 120.

Park buffer 122 is generally a searchable data store (e.g., a database) that stores sensor data received from the one or more wind turbines 110 in a wind farm. The data may be correlated with a timestamp indicating when the data was obtained from the relevant sensor(s) at wind turbine 110 and an identification of the wind turbine 110 from which wind farm server 120 received the data.

Park buffer 122 generally receives a query from a client device via buffer service 124, as discussed in further detail below. The query may identify, for example, that a user wishes to view data for a particular turbine, date range, and number of (or type of) sensors, and park buffer 122 can generate a data set (or data file) for transmission to the client device in response to the query. In some cases, park buffer 122 may generate the data set as a structured data file (e.g., an extensible markup language (XML) file) that a client device can parse to extract the requested data for display and analysis. In another case, park buffer 122 may generate the data set as a data table that buffer service 124 can parse and process to generate a report for transmission to a client device.

Buffer service 124 generally allows a user to configure data collection at park buffer 122 and can provide wind turbine sensor data stored in park buffer 122 in response to queries transmitted to buffer service 124 from one or more client devices.

To configure data collection at park buffer 122, buffer service 124 generally uses a certificate to establish data logging parameters for the wind turbines 110 in a wind farm. The certificate generally is used to identify and authenticate a user and may include a number of signals to be buffered for a client and an identity of the signals (e.g., the specific sensors to be monitored and logged at park buffer 122). In some cases, the certificate can include additional configuration information indicating a periodicity at which data from the identified sensors is recorded and saved a park buffer 122. For example, the certificate can include data indicating that certain data points are to be buffered every $n^{th}$ sample, a retention time period for data buffered from a wind turbine 110, and so on. Based on the configuration data in the certificate, buffer service 124 can publish a catalog of signals available to one or more client devices.

Over time (e.g., as additional wind turbines 110 are added to a wind farm), a user may wish to add support for additional signals at park buffer 122. To add logging of additional signals to park buffer 122, the certificate can be updated to include a larger number of signals to be buffered and an identity of the new signals to be monitored and logged at park buffer 122. Upon receiving the updated configuration information, park buffer 122 may begin recording the additional signals specified in the certificate.

Buffer service 124 additionally includes an interface for receiving queries from a client device and, in response to a query, provide the specified data from park buffer 122. In some cases, to receive queries from a client device and transmit the requested data to a client device, buffer service 124 may expose a web service (e.g., a Simple Object Access Protocol (SOAP) web service, REST web service, and so on)

to one or more client devices. In some cases, the query received at buffer service 124 generally includes an identity of the turbines, time periods, and signals from each of the turbines that a user wishes to obtain data for.

In response to the query, buffer service 124 can request the specified data from park buffer 122. In some cases, the request may be structured as a database query, and in response to performing the request on park buffer 122, buffer service 124 can receive a data object including each of the requested data points. For example, the data object may be a two-dimensional array including multiple table entries, with each table entry representing a single reading from a specified sensor at a specified turbine 110.

When buffer service 124 receives the requested data from park buffer 122, buffer service 124 can generate a response to transmit to the requesting client device. The response may be, for example, a structured data file, such as an extensible markup language (XML) file. The generated response may be transmitted to the requesting client device for further processing, as discussed in further detail below. In some cases, the generated response may be deleted when the requesting client device acknowledges receipt of the response.

Forwarding service 126 generally forwards data obtained from one or more wind turbines 110 at park buffer 122 and forwards the data to data analysis system 150 for additional processing. Forwarding service 126 generally provides a list of wind turbines 110 in the wind farm to data analysis system 150 and receives a subscription policy from data analysis system 150 or a centralized authentication authority indicating the data points that forwarding service is to provide to data analysis system 150. In some cases, the subscription policy may additionally identify how forwarding service 126 is to provide data to data analysis system 150. For example, forwarding service 126 may forward a batch of data to data analysis system 150 periodically (e.g., every day, 12 hours, and so on), or as data is saved at park buffer 122. In some cases, forwarding service 126 may be configured to buffer the specified data points and provide the specified data points to data analysis system 150 on request, as discussed above with respect to buffer service 124.

After configuring data forwarding based on the received subscription policy, forwarding service 126 pushes data to data analysis system 150. In some cases, forwarding system 126 can process the data before transmitting the data to data analysis system 150. For example, the data can be encrypted for security purposes, as defined in the subscription policy. If a subscription policy includes a bandwidth limitation, forwarding system 126 can compress the sensor data before transmitting the data to data analysis system 150. In some cases, forwarding system 126 may support multiple compression techniques and may choose a compression technique based on the configured bandwidth restrictions. For example, a high speed, low compression technique may be used if the configured bandwidth restriction allows for a larger amount of data to be transmitted over a period of time. For connections with higher bandwidth restrictions, forwarding system 126 can use compression techniques that can generate a smaller file to be transmitted to data analysis system 150.

In some cases, if a subscription policy includes a bandwidth limitation, forwarding service 126 can examine the data requested by the subscription policy against the bandwidth limitation. If the data requested by the subscription policy exceeds the bandwidth limitation, forwarding service 126 can reject the subscription and inform a user that the subscription policy should be modified to include fewer data points for buffering and transmission to data analysis system 150.

In some cases, the subscription policy may include additional configuration information for data forwarding to data analysis system 150. For example, the subscription policy may identify a priority ranking for one or more data points to be forwarded to data analysis system 150. If resources at wind farm server 120 are overcommitted (e.g., exceeds total bandwidth available for processing and forwarding data), forwarding service 126 can use the priority rankings to forward higher priority signals to data analysis system 150 before forwarding lower priority signals to data analysis system 150.

Similarly to buffer service 124, forwarding service 126 may be updated to add or modify a data subscription from park buffer 122. For example, a user of data analysis system 150 may wish to monitor and record new signals at park buffer 122 or change a recording configuration for signals that have been previously configured and are already recorded at park buffer 122. To update a data subscription, forwarding system 126 can receive a new subscription policy from data analysis system 150. In response, forwarding system 126 can update park buffer 122 to request and record data from the sensors identified in the updated data subscription from data analysis system 150.

In some cases, buffered or subscription-restricted data may be downloaded through forwarding system 126 on request. For example, such data may be used when a service technician performs maintenance on a particular wind turbine 110 in a wind farm. A service technician can connect to forwarding system 126 using a certificate that identifies the technician and the data that the technician can access and download to the technician's computer for analysis. Using a toolkit on the technician's computer, the technician can download the specified data and perform maintenance on the wind turbine 110 based on the downloaded data.

Client computer 140 generally requests data from wind farm server 120 (e.g., via buffer service 124) and displays the data to a user via data view 142. Client computer 140 generally allows an engineer or technician to view the current operating status of one or more wind turbines 110 in a wind farm. Based on the current operating status of a wind turbine 110, as illustrated by one or more data points from sensors in the wind turbine 110, an engineer or technician can identify when the wind turbine 110 is operating outside of specified parameters and take action to perform maintenance on the wind turbine 110.

Data viewer 142 may be, for example, one or more human-machine interfaces configured to request one or more data points from wind farm server 120 for display. In some cases, data viewer 142 may be configured to transmit requests to buffer service 122 for data from one or more sensors to be displayed in data viewer 142. For example, a first screen in data view 142 may be configured to provide an overview of the wind farm, which may include, for example, the health of a turbine and instantaneous power generation readings for each wind turbine 110 in the wind farm. While a technician views the first screen, data view 142 can request data relevant to the overview screen from wind farm server 120 via buffer service 124. Other screens in data view 142 may provide more granular details about the operating status of a particular wind turbine 110 and may transmit a request for sensor data from a particular wind turbine 110 to buffer service 124.

In some cases, data viewer 142 may additionally include one or more historical data screens. These historical data screens may allow a technician to specify one or more data points over a specified date range to request from wind farm server 120. When data viewer 142 receives the requested data, data viewer 142 can display the data in a tabular format that a technician can print. In some cases, data viewer 142 may additionally include graphing functions that data viewer 142 can use to generate a plot of the retrieved sensor data. Technicians may use the data displayed on these plots, for example, to identify operation trends for one or more wind turbines 110 in the wind farm.

Data analysis system 150 may be maintained, for example, by a manufacturer of wind turbines 110 to monitor the performance of each wind turbine 110, perform data forecasting, and so on. As illustrated, data analysis system 150 includes an external data interface 152 and a wind farm data analyzer 154.

External data interface 152 generally provides a connection between data analysis system 150 and wind farm server 120 via forwarding service 126. In some cases, to establish a connection between data analysis system 150 and wind farm server 120, external data interface 152 can transmit a subscription policy to forwarding service 126 that identifies the sensor data to be forwarded to data analysis system 150, a periodicity for transmitting data for each of the identified sensors, and so on.

External data interface 152 additionally provides a connection between data analysis system 150 and other external data sources that data analysis system 150 can use in analyzing data provided by wind farm server 120 for one or more wind turbines 110 in a wind farm. For example, external data interface 152 may allow data analysis system 150 to obtain historical weather and wind speed data for a given time period at a given location to analyze past performance and obtain forecasted weather and wind speed data to predict future performance of wind turbines 110 at a wind farm.

Wind farm data analyzer 154 generally uses the data obtained through external data interface 152 to monitor the performance of wind turbines 110 across various wind farm installations. By monitoring past performance of wind turbines 110, wind farm data analyzer can identify potential changes to perform on the wind turbines 110 in a given wind farm (e.g., changes to blade installation based on performance differences between a wind turbine $110_1$ with a first blade design and a wind turbine $110_2$ with a second blade design). Wind farm data analyzer 154 may additionally use past performance to identify time windows in which technicians can perform maintenance on a wind turbine 110 with minimal effects on power generation at the wind farm.

Figure 2:
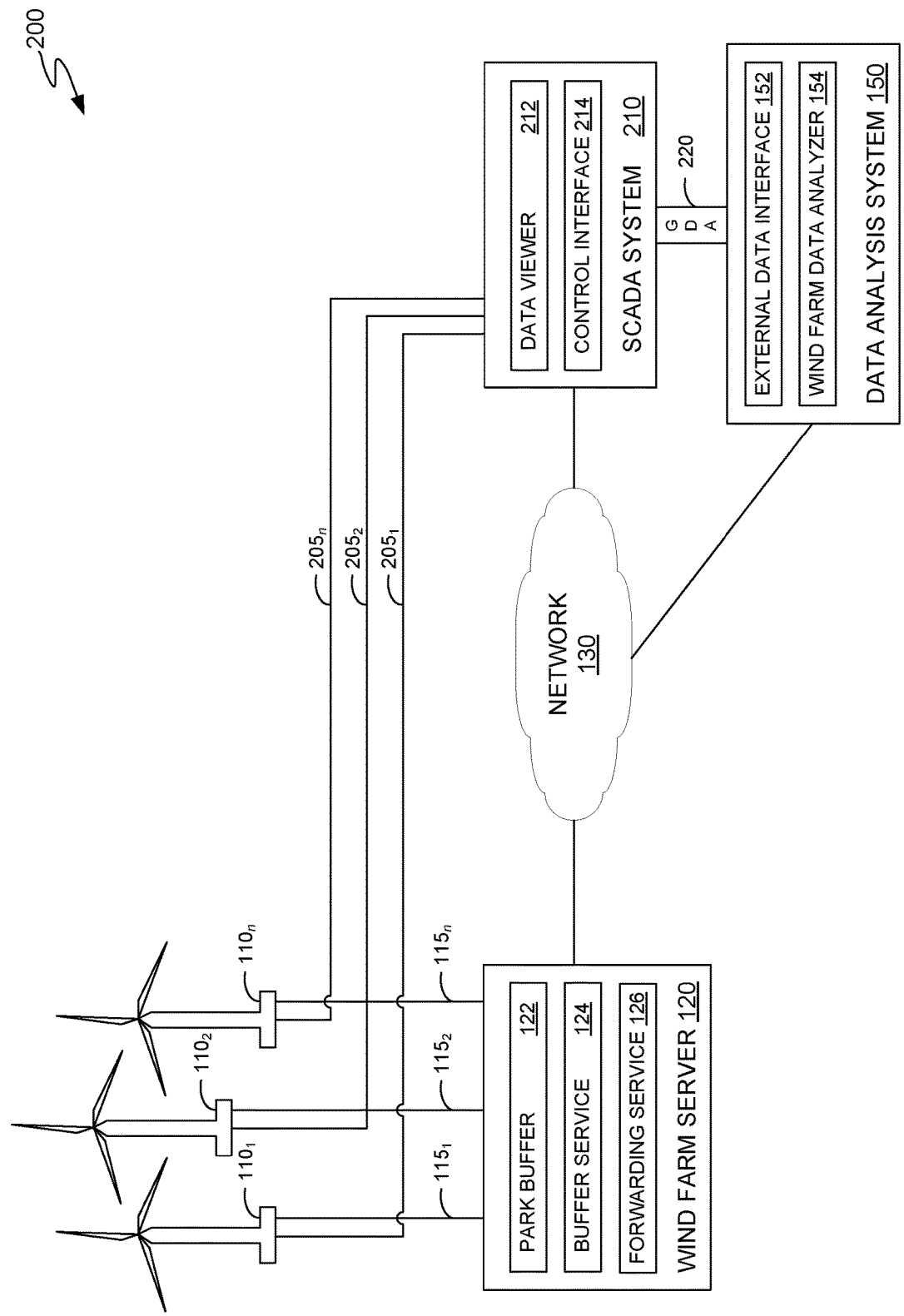
FIG. 2 illustrates an example wind turbine data collection system with an external supervisory control and data acquisition (SCADA) system connected to each of the turbines, according to an embodiment of the present disclosure.

FIG. 2 illustrates an example data collection system 200, according to an embodiment of the present disclosure. As illustrated, data collection system 200 may use existing supervisory control and data acquisition (SCADA) infrastructure to provide a buffer and forwarding service to one or more client computers and a data analysis system.

As illustrated, data collection system 200 includes one or more wind turbines 110 connected to a wind farm server 120 via one or more connections 115 and a SCADA system 210 via one or more connections 205. In some cases, wind turbines 110 need not be connected to wind farm server via connections 115, which may allow data collection system 200 to leverage existing SCADA infrastructure. Wind farm server 120, SCADA system 210, and data analysis system 150 may be connected via network 130.

SCADA system 210 may be previously installed and may include a plurality of connections 205 to one or more wind turbines 110 in a wind farm. Connections 205 may be a wired or wireless connection that allows wind turbines 110 to provide sensor data to SCADA system 210 and allows SCADA system to transmit control information to a wind turbine 110. SCADA system 210 may log and display the sensor data received from a wind turbine 110 via its associated connection 205, and the control information transmitted from SCADA system 210 to a wind turbine 110 may control one or more operating parameters for the wind turbine (e.g., blade pitch, start/stop state, and so on).

As illustrated, SCADA system 210 generally includes a data viewer 212 and a control interface 214. Data view 212 is generally configured to obtain sensor data from one or more wind turbines from at least one of wind farm server 120, via one or more queries transmitted to buffer service 124, or directly from a wind turbine 110 via the associated connection 205. In some cases, if a wind turbine is connected to both wind farm server 120 via connections 115 and SCADA system 210 via connections 205, data viewer 212 can choose to request wind turbine data from wind farm server 120. By requesting wind turbine data from wind farm server 120, SCADA system 210 can repurpose connections 205 as dedicated control signaling connections between wind turbines 110 and SCADA system 210.

In some cases, where SCADA system 210 directly receives sensor data from one or more wind turbines 110 in a wind farm, SCADA system 210 may be configured to periodically transmit the sensor data to wind farm server 120 for storage in park buffer 122. In some cases, such data may be saved in a temporary buffer at SCADA system 210 and transmitted to wind farm server 120 according to a preset schedule (e.g., every ten minutes). Additionally, alarms generated at a wind turbine 110 may be transmitted to wind farm server 120 as these alarms are generated.

Control interface 214 generally provides an interface that allows a user (or automated supervisory control functionality at SCADA system 210) to transmit control signals to a wind turbine 110. The control signals may be used to modify one or more operating parameters for a wind turbine 110, such as blade pitch, start/stop status, and so on. In some cases, the control signals transmitted through control interface 214 may be generated in response to user input detected in data view 212. For example, if data viewer 212 includes an interactive control panel that allows a user to toggle between a start (power generation) mode and a stop (idle) mode, control interface 214 may transmit a binary data point correlated to the position of the toggle. That is, if the toggle in data viewer 212 is moved from an idle to a power generation mode, control interface 214 can generate a signal to inform the appropriate wind turbine 110 to rotate the turbine to a power generation position. Likewise, if the toggle in data viewer 212 is moved from a power generation to an idle mode, control interface 214 can generate a signal to inform the appropriate wind turbine 110 to rotate out of a power generation position.

In some cases, data analysis system 150 may receive data from SCADA system 210 via an existing near-real-time data acquisition connection 210 in addition to subscribing to and receiving data from wind farm server 120 via forwarding service 126. Data analysis system 150 may store data received from SCADA system 210 locally for analysis, data forecasting, and so on.

Figure 3:
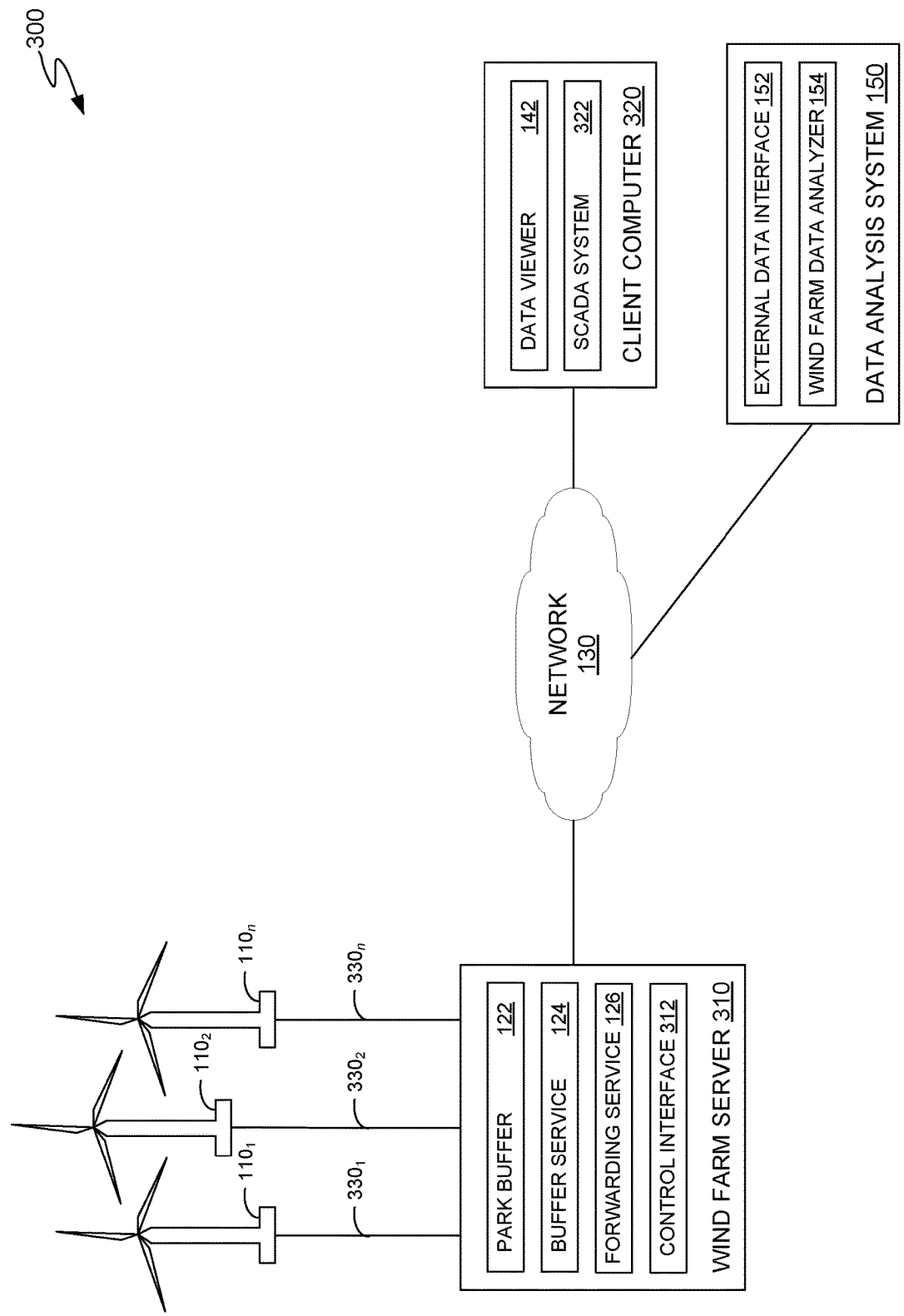
FIG. 3 illustrates an example wind turbine data collection system with an integrated SCADA system, according to an embodiment of the present disclosure.

FIG. 3 illustrates an example data collection system 300 with an integrated SCADA system, according to one embodiment. As illustrated, data collection system 300 includes a wind farm server 310 connected to one or more wind turbines 110 via a data connection 330, a client computer 320, and a data analysis system 150.

Wind farm server 310 generally includes a park buffer 122, buffer service 124, forwarding service 126, and a control interface 312. As discussed above, park buffer 122 generally provides a data repository which stores sensor data received from the one or more wind turbines 110 in a wind farm. Buffer service 124 is generally configured to receive information about a subscription of signals that a user can access by transmitting a query to buffer service 124 for data associated with the one or more subscribed signals. Buffer service 124 generally receives a request and queries park buffer 122 for the requested data. Upon receiving the requested data from park buffer 122, buffer service 124 parses the requested data into a file and transmits the data file to the requesting client computer 320. Forwarding service 126 is generally configured to receive a subscription policy for sensor data associated with one or more wind turbines 110 from a data analysis system 150. Based on the subscription policy, forwarding service transmits data received from a wind turbine 110 and stored in park buffer 122 to data analysis system 150 for further analysis As illustrated, wind farm server 310 additionally includes a control interface 312. Control interface 312 is generally configured to receive control signals from a client computer 320 and modify the operating parameters of a wind turbine 110 based on the received control signals. A control signal received from client computer 320 may include, for an example, the identity of the wind turbine 110 that is to be modified and one or more additional data points with information about how the operating parameters of the specified wind turbine 110 is to be modified. Based on the received control signal, control interface 312 can generate one or more signals to effect the requested changes to the operating parameters of wind turbine 110 and transmit these signals to the specified wind turbine 110 via bidirectional data connection 330. Bidirectional data connection 330 may include, for example, a downlink raw data stream over which a wind turbine 110 transmits sensor and alarm data to wind farm server 310 and one or more uplink control channels over which control signals are transmitted from the wind farm server 310 to a wind turbine 110.

Client computer 320 generally includes a data viewer 142 and a SCADA system 322. As described above, data viewer 142 generally allows a user to view the operating status and sensor data for one or more turbines 110 in a wind farm. To populate one or more screens with operating status and sensor data for the one or more wind turbines 110 in a wind farm, data view 142 periodically queries wind farm server 310 for sensor data for a given time period. When data viewer 142 receives the sensor data from wind farm server 310, data viewer 142 can populate the appropriate screens in data viewer 142 with the received data.

Client computer 320 further includes a SCADA system 322, which generally allows a user to modify the operating parameters of one or more wind turbines through client computer 320. SCADA system 322 generally provides a human-machine interface (HMI) that allows a user to select a particular feature or sensor location of a wind turbine 110 and modify the operating parameters of the wind turbine 110. For example, a technician could select a gearbox in a particular wind turbine 110 and limit the rotational speed of a component of the gearbox to a specified rotational speed. In another example, a technician could specify a maximum operating temperature for certain components in a wind turbine 110. When SCADA system 322 detects that the current operating temperature of a specified component exceeds the maximum operating temperature, SCADA system 322 can send a signal to the appropriate wind turbine 110 to slow down or temporary halt operations at the specified wind turbine 110. The modified operating parameters may remain active at the specified wind turbine 110 until the temperature of the specified component falls below the specified maximum operating temperature.

Figure 4:
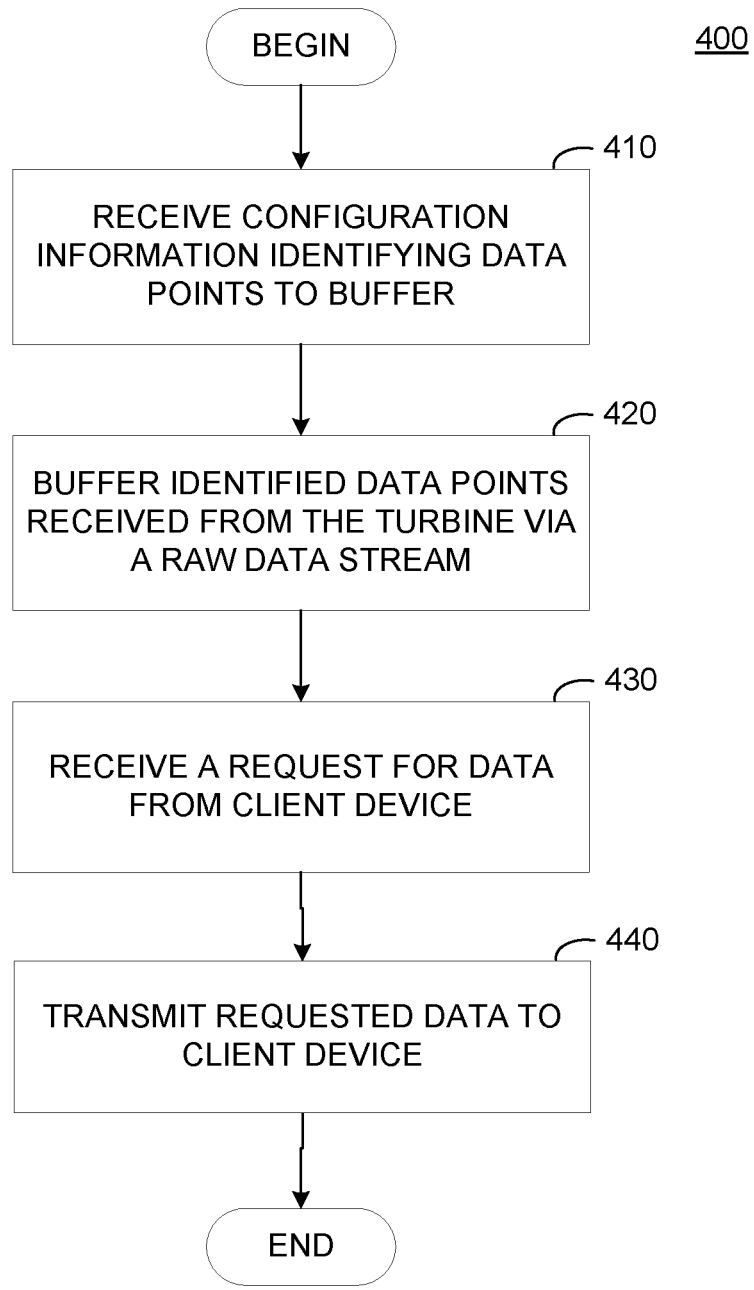
FIG. 4 illustrates example operations that may be performed by a wind farm server to configure data collection from one or more wind turbines and provide the collected data to a requesting client device, according to an embodiment of the present disclosure.

FIG. 4 illustrates example operations 400 that may be performed to configure and perform data collection at a wind farm server from one or more wind turbines, according to one embodiment. As illustrated, operations 400 begin at step 410, where a wind farm server 120 receives configuration information identifying one or more data points to buffer from a wind turbine 110. The configuration information may identify a specific set of turbines to be monitored and types of information to obtain from the identified set of turbines. For example, the configuration information may identify particular sensors (e.g., rotational speed, temperature, vibration, and so on) that a user wishes to obtain from the wind turbines 110 in a wind farm. In some cases, the configuration information may be transmitted as a certificate identifying the user, a number of signals the user can obtain from the wind turbines 110 in the wind farm, and the sensor data that the user wishes to obtain from the wind farm.

At step 420, the wind farm server buffers the identified data points. The wind farm server 120 generally receives sensor data from one or more wind turbines 110 in a wind farm via a raw data stream between a wind turbine 110 and the wind farm server 120. The wind farm server 120 may receive and buffer data points from the one or more wind turbines 110 in real time (e.g., as sensor data is transmitted from a wind turbine 110 via the raw data stream). In some cases, wind farm server may receive data points from the one or more wind turbines 110 periodically as a bulk transmission of data over a time period. Bulk data may, in some cases, be received at the wind farm server 120 as a compressed file. The wind farm server 120 may decompress the data file, extract the received sensor data from the data file, and store it in a searchable buffer.

At step 430, the wind farm server receives a request for data from a client. The query generally specifies one or more data points and a time period over which the data points are to be retrieved. Based on the request, the wind farm server can generate a query to execute on the searchable buffer, and in response, the wind farm server receives a dataset with the requested sensor data over the requested time period. At step 440, the wind farm server transmits the requested data points to a client device. The requested data points may be transmitted, for example, as an XML file that the client device can parse to retrieve and display the data transmitted in the file.

Figure 5:
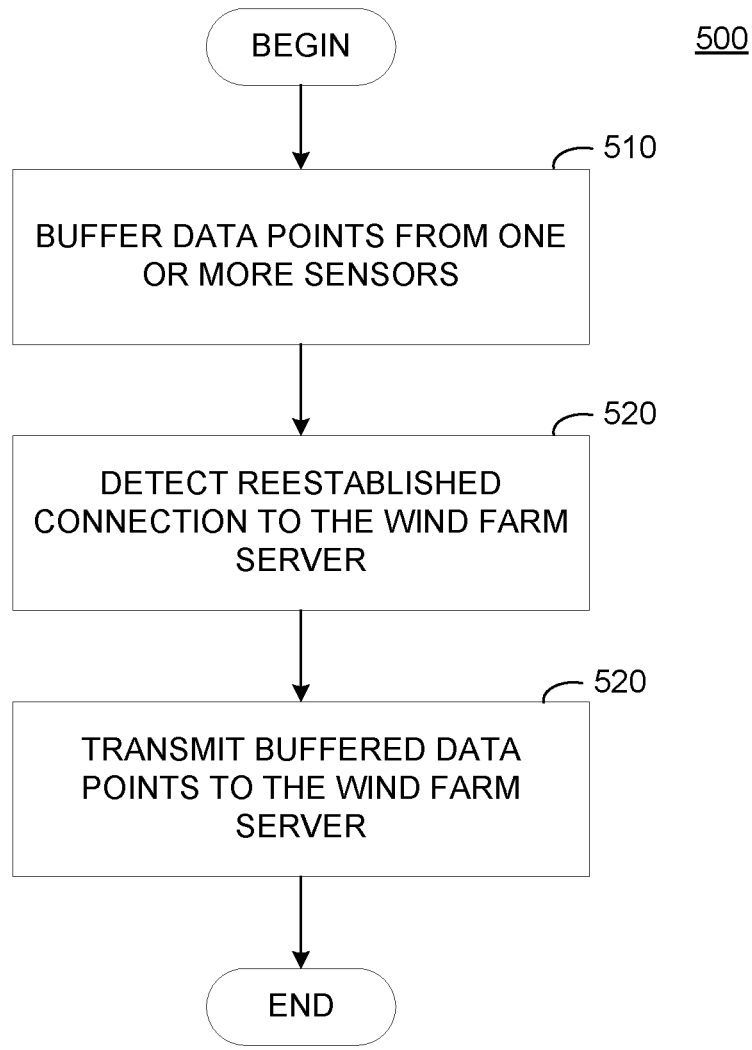
FIG. 5 illustrates example operations that may be performed by a wind turbine to reconnect to a wind farm server and provide buffered data to the wind farm server on reconnection, according to an embodiment of the present disclosure.

FIG. 5 illustrates example operations 500 that may be performed at a wind turbine 110 to buffer data for transmission to a wind farm server 120, according to one embodiment. As illustrated, operations 500 begin at step 520, where a wind turbine 110 buffers data points from one or more sensors while the wind turbine 110 is disconnected from the wind farm server 120. As discussed above, a wind turbine 110 can determine that it is disconnected from wind farm server 120 when the wind turbine 110 fails to detect a heartbeat signal (or other signal indicating that the wind farm server 120 is active and ready to receive data). In some cases, a wind turbine 110 can detect that the wind farm server 120 is unavailable by attempting to establish a connection with the wind farm server 120 and detecting that the wind turbine did not receive a response within a predetermined time period.

At step 520, the wind turbine 110 detects that a connection to the wind farm server 120 has been reestablished. The wind turbine 110 can detect that the connection to the wind farm server 120 has been reestablished, for example, by detecting a heartbeat signal from the wind farm server 120. Upon detecting that the connection to the wind farm server 120 has been reestablished, at step 530, the wind turbine 110 transmits the buffered data points to the wind farm server 120. To accelerate transmission of the buffered data, the wind turbine can compress the buffered data points into a compressed file and transmit the compressed file to the wind farm server 120 to be decompressed and stored in the wind farm server's data buffer.

Figure 6:
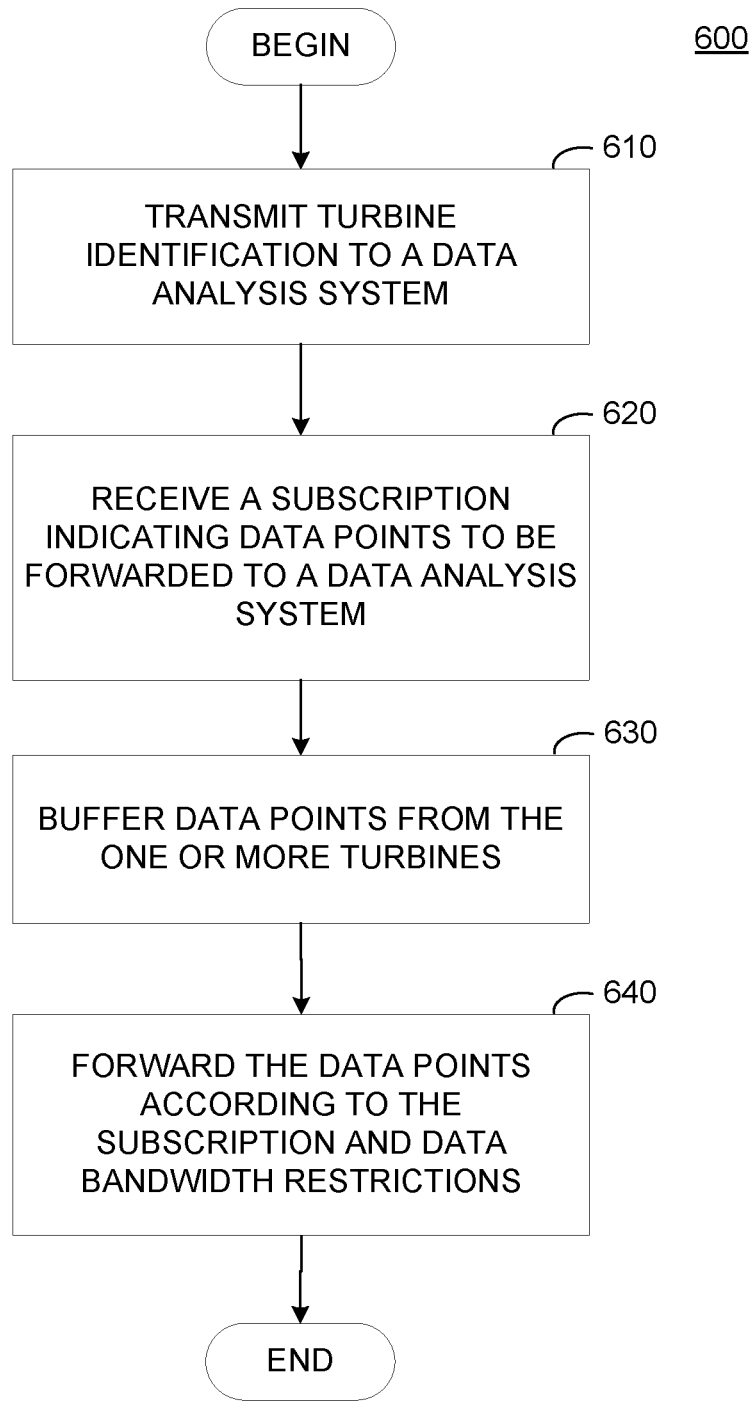
FIG. 6 illustrates example operations that may be performed by a wind farm server to configure data collection from one or more wind turbines, according to an embodiment of the present disclosure.

FIG. 6 illustrates example operations 600 that may be performed at a wind farm server 120 to forward wind turbine data to a data analysis system, according to one embodiment. As illustrated, operations 600 begin at step 610, where the wind farm server transmits, to data analysis system 150, data identifying one or more turbines available for monitoring. The data may include, for example, a turbine serial number (or other unique identifier), the turbine model number, and a list of signals available from the one or more sensors installed on the turbine.

At step 620, the wind farm server 120 receives a data subscription for each of the one or more turbines from the data analysis system 150. The data subscription generally indicates one or more data points to be forward to a data analysis system. In some cases, the data subscription additionally indicates a data transmission policy and a bandwidth policy for forwarding data from wind farm server 120 to data analysis system 150. For example, the data transmission policy may indicate that the wind farm server 120 is to transmit the requested data points in real-time (e.g., as wind farm server 120 receives sensor data from the wind turbine 110), periodically, or on request. The bandwidth policy may indicate a maximum amount of data that wind farm server 120 can forward to data analysis system 150 over a period of time.

At step 630, the wind farm server 120 obtains the data points from the one or more wind turbines 110 and buffers the obtained data points. As discussed above, the wind farm server 120 obtains the one or more data points, for example, via a raw data stream connecting the one or more wind turbines 110 to the wind farm server 120. Wind farm server 120 can buffer the obtained data points in a park buffer, which may be, for example, a searchable database. Each data point stored in the park buffer may be associated with a timestamp and an identifier of the wind turbine that generated the data point.

At step 640, the wind farm server 120 forwards the one or more data points to the data analysis system 150 according to the subscription and the data bandwidth restrictions. As discussed above, the wind farm server 120 can forward data points to the data analysis system 150 as the wind farm server 120 receives the data points from the wind turbines 110, periodically according to a set schedule, or on demand. Further, wind farm server 120 can compress the data points to be forward to comply with the bandwidth restrictions identified in the subscription.

Figure 7:
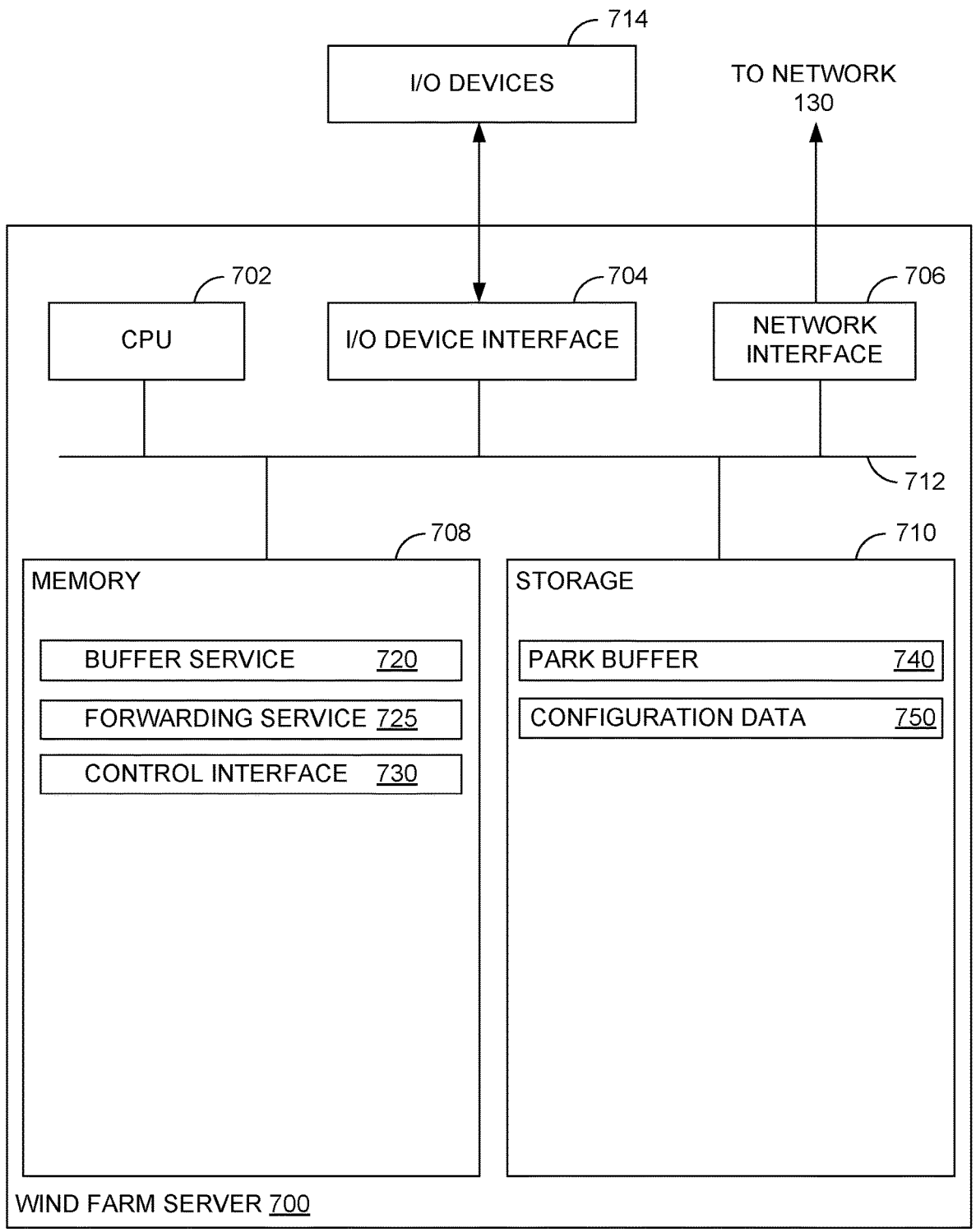
FIG. 7 illustrates an example data collection system for wind turbine data, according to an embodiment of the present disclosure.

FIG. 7 illustrates an example wind farm server 700 that receives data from one or more wind turbines via a raw data stream and makes the data available to client systems, according to an embodiment. As shown, the wind farm server 700 includes, without limitation, a central processing unit (CPU) 702, one or more I/O device interfaces 704 which may allow for the connection of various I/O devices 714 (e.g., keyboards, displays, mouse devices, pen input, etc.) to the endpoint system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. Additionally, the memory 706 is included to be representative of a random access memory. Furthermore, the storage 710 may be a disk drive. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 includes a buffer service 720, forwarding service 725, and a control interface 730. Buffer service 720 generally uses a data configuration received from a client computer and stored in configuration data 750 to identify data points to be logged for one or more wind turbines 110. Based on the data configuration, buffer service 720 configures park buffer 740 to store the identified data points with data linking a data point to a particular wind turbine 110 and a timestamp. Buffer service 720 additionally exposes a search interface (e.g., as a web service) to one or more client devices, which may indicate to a client device the data available for retrieval from park buffer 740. When buffer service 720 receives a query for data, buffer service 720 executes a query on park buffer 740 and transmits the data received from park buffer 740 to the requesting client device.

Forwarding service 725 generally informs a data analysis system of the wind turbines 110 in a wind farm that wind farm server can monitor and receives a data configuration indicating a subscription of sensor data to be forwarded to the data analysis system. The data configuration may be stored in configuration data 750 and may additionally include a data forwarding policy and a bandwidth policy. The data forwarding policy generally indicates when data received from a wind turbine 110 should be forwarded to the data analysis system. For example, the data forwarding policy may indicate that data should be transmitted in real-time, buffered and transmitted periodically, or buffered and transmitted on request. The bandwidth policy generally indicates a maximum amount of data that wind farm server 700 can transmit to a data analysis system during a given time period. As wind farm server 700 receives data from wind turbines 110, forwarding service 725 forwards the subscribed sensor data to the data analysis system according to the forwarding policy and bandwidth policy.

Control interface 730 generally allows wind farm server 700 to receive control signals from a wind turbine controller (e.g., SCADA interface) at a client computer 140. The control signals generally include data that indicates a change to one or more operating parameters of a specific wind turbine 110. Control interface 730 can generate one or more signals to transmit to a specified wind turbine 110 to perform the requested operating parameter change. In some cases, the control interface 110 can transmit the generated signals to a wind turbine 110 using the raw data stream connection between the wind turbine 110 and wind farm server 700.

As shown, storage 710 includes a park buffer 740 and configuration data 750. Park buffer 740 generally provides a searchable repository that stores sensor data from one or more wind turbines 110 in a wind farm. In some cases, park buffer 740 may be structured as a database and may store sensor data, the identity of the turbine associated with the stored sensor data, and a timestamp indicating when wind farm server 700 received the data from the wind turbine 110. When a client device 140 requests data through buffer service 720, park buffer 740 generally receives a search query from buffer service 720 indicating the data requested by the client device and provides the requested data set to buffer service 720 for further processing and transmission to the client device 140. In some cases, when forwarding service 725 forwards sensor data to a data analysis system 150 according to a schedule or on demand, park buffer 740 receives a request for data to be forwarded to the data analysis system. In response, park buffer provides the requested data set to forwarding service 725 for additional processing and transmission to the data analysis system.

Configuration data 750 generally stores one or more certificates or configuration files used to identify a user or client device and the signals to be buffered at wind farm server 700 for transmission to a client computer 140 or data forwarding system 150. As client needs change, the certificates in configuration data 750 may be replaced to reflect a user subscription for buffering additional signals. Additionally, as additional turbines 110 are installed in the wind farm, wind farm server 700 can inform a data analysis system about the new turbines and update the configuration data for the data analysis system to include data forwarding for the new turbines.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A computer-implemented method for collecting data from a plurality of wind turbines, comprising:

receiving, from a client device, a subscription request identifying a set of wind turbines, a plurality of data points to collect from the set of wind turbines, a time period during which the plurality of data points from the set of wind turbines is to be retained, and a bandwidth policy identifying a maximum amount of data to forward to the client device over a first specified time period;

establishing a client interface with the client device;

receiving the plurality of data points from the set of wind turbines;

in response to the subscription request, buffering the plurality of data points from the set of wind turbines in a data repository;

receiving, through the client interface, a request for at least one of the plurality of data points from the set of wind turbines over a second specified time period;

in response to the request for the at least one of the plurality of data points, generate and execute against the data repository, a query for the at least one of the plurality of data points;

transmitting, subject to the bandwidth policy, the at least one of the plurality of data points from the data repository to the client device; and removing the plurality of data points from the data repository after the time period expires.

2. The method of claim 1, wherein the one or more data points are received from the plurality of wind turbines via a raw data stream from the plurality of wind turbines.

3. The method of claim 2, further comprising:
receiving, from the client device, a request to change one or more operating parameters for a first of the plurality of wind turbines; and
transmitting, via the raw data stream, the change to the one or more operating parameters to the first wind turbine.

4. The method of claim 3, wherein the request is received through the client interface.

5. The method of claim 1, further comprising:
transmitting identifying information for the plurality of wind turbines to a second client device;
receiving, from the second client device, a second subscription request identifying a plurality of data points to forward from the plurality of wind turbines; and
forwarding the identified data points from the data repository to the second client device based on the second subscription request.

6. The method of claim 5, wherein the second subscription request includes a forwarding policy identifying a periodicity for forwarding the plurality of data points to the second client device.

7. The method of claim 5, wherein the second subscription request includes a second bandwidth policy identifying a maximum amount of data to forward to the second client device over a specified time period.

8. The method of claim 7, wherein forwarding the identified data points comprises:
generating a file including the identified data points; and
compressing the generated file to comply with the second bandwidth policy.

9. The method of claim 1, wherein transmitting the requested data points to the client device comprises transmitting a parseable data file including the requested data points to the client device.

10. A non-transitory computer-readable medium comprising instructions which, when executed, perform an operation for collecting data from a plurality of wind turbines, the operation comprising:
receiving, from a client device, a subscription request identifying a set of wind turbines, a plurality of data points to collect from the set of wind turbines, a time period during which the plurality of data points from the set of wind turbines is to be retained, and a bandwidth policy identifying a maximum amount of data to forward to the client device over a first specified time period;
establishing a client interface with the client device;
receiving the plurality of data points from the set of wind turbines;
in response to the subscription request, buffering the plurality of data points from the set of wind turbines in a data repository;
receiving, through the client interface, a request for at least one of the plurality of data points from the set of wind turbines over a second specified time period;
in response to the request for the at least one of the plurality of data points, generate and execute against the data repository, a query for the at least one of the plurality of data points;
transmitting, subject to the bandwidth policy, the at least one of the plurality of data points from the data repository to the client device; and
removing the plurality of data points from the data repository after the time period expires.

11. The non-transitory computer-readable medium of claim 10, wherein the one or more data points are received from the plurality of wind turbines via a raw data stream from the plurality of wind turbines.

12. The non-transitory computer-readable medium of claim 11, wherein the operations further comprise:
receiving, from the client device, a request to change one or more operating parameters for a first of the plurality of wind turbines; and
transmitting, via the raw data stream, the change to the one or more operating parameters to the first wind turbine.

13. The non-transitory computer-readable medium of claim 10, wherein the operations further comprise:
transmitting identifying information for the plurality of wind turbines to a second client device;
receiving, from the second client device, a second subscription request identifying a plurality of data points to forward from the plurality of wind turbines; and
forwarding the identified data points from the data repository to the second client device based on the second subscription request.

14. The non-transitory computer-readable medium of claim 13, wherein the second subscription request includes at least one of:
a forwarding policy identifying a periodicity for forwarding the plurality of data points to the second client device; and
a second bandwidth policy identifying a maximum amount of data to forward to the second client device over a specified time period.

15. A system, comprising:
a processor; and
a memory including instructions which, when executed by the processor, perform an operation for collecting data from a plurality of wind turbines, the operation comprising:
receiving, from a client device, a subscription request identifying a set of wind turbines, a plurality of data points to collect from the set of wind turbines, a time period during which the plurality of data points from the set of wind turbines is to be retained, and a bandwidth policy identifying a maximum amount of data to forward to the client device over a first specified time period;
establishing a client interface with the client device;
receiving the plurality of data points from the set of wind turbines;
in response to the subscription request, buffering the plurality of data points from the set of wind turbines in a data repository;
receiving, through the client interface, a request for at least one of the plurality of data points from the set of wind turbines over a second specified time period;
in response to the request for the at least one of the plurality of data points, generate and execute against the data repository, a query for the at least one of the plurality of data points;
transmitting, subject to the bandwidth policy, the at least one of the plurality of data points from the data repository to the client device; and
removing the plurality of data points from the data repository after the time period expires.

16. The system of claim 15, wherein the one or more data points are received from the plurality of wind turbines via a raw data stream from the plurality of wind turbines.

17. The system of claim 16, wherein the operations further comprise:
- receiving, from the client device, a request to change one or more operating parameters for a first of the plurality of wind turbines; and
- transmitting, via the raw data stream, the change to the one or more operating parameters to the first wind turbine.

18. The system of claim 15, wherein the operations further comprise:
- transmitting identifying information for the plurality of wind turbines to a second client device;
- receiving, from the second client device, a second subscription request identifying a plurality of data points to forward from the plurality of wind turbines; and
- forwarding the identified data points from the data repository to the second client device based on the second subscription request.

19. The system of claim 18, wherein the second subscription request includes at least one of:
- a forwarding policy identifying a periodicity for forwarding the plurality of data points to the second client device; and
- a second bandwidth policy identifying a maximum amount of data to forward to the second client device over a specified time period.

20. The system of claim 15, wherein transmitting the requested data points to the client device comprises transmitting a parseable data file including the requested data points to the client device.

* * * * *